US008821250B2

(12) United States Patent
Hsu

(10) Patent No.: US 8,821,250 B2
(45) Date of Patent: Sep. 2, 2014

(54) METHOD OF REIMBURSING PLAYERS FOR SLOT MACHINES

(76) Inventor: Tien-Shu Hsu, Taichiu (TW)

( * ) Notice: Subject to any disclaimer, the term of this patent is extended or adjusted under 35 U.S.C. 154(b) by 190 days.

(21) Appl. No.: 13/004,714

(22) Filed: Jan. 11, 2011

(65) Prior Publication Data

US 2012/0178516 A1 Jul. 12, 2012

(51) Int. Cl.
*A63F 13/00* (2014.01)
*G07F 17/32* (2006.01)

(52) U.S. Cl.
CPC .................................. *G07F 17/3244* (2013.01)
USPC ............................................................ 463/20

(58) Field of Classification Search
USPC ...................................................... 463/16–20
See application file for complete search history.

(56) References Cited

U.S. PATENT DOCUMENTS 5,910,048 A * 6/1999 Feinberg ......................... 463/25
2003/0119585 A1* 6/2003 Walker et al. .................. 463/25
2006/0040730 A1* 2/2006 Walker et al. .................. 463/20
2006/0160595 A1* 7/2006 Gerson et al. .................. 463/16
2006/0160959 A1* 7/2006 Kamishima et al. ....... 525/331.9

* cited by examiner

*Primary Examiner* — David L Lewis
*Assistant Examiner* — Eric M Thomas
(74) *Attorney, Agent, or Firm* — Muncy, Geissler, Olds & Lowe, P.C.

(57) ABSTRACT

A method of reimbursing players adopted for slot machines. The method includes steps of: executing a recording module, executing a reimbursement judgment module, executing a reimbursement game module, executing a win judgment module and executing a game selection module. The recording module records game rounds and game conditions of the slot machine. The reimbursement judgment module judges whether a reimbursement condition is satisfied, if yes, repeatedly execute the reimbursement game module to accumulate game scores; otherwise, execute the game selection module. The win judgment module stops execution of the reimbursement game module and executes the game selection module after having judged that the game conditions have reached a reimbursement threshold setting. The game selection module allows a player to select to restart the game or end the game. Thus the invention assures the player to get a certain amount of the game scores during playing the slot machine.

9 Claims, 5 Drawing Sheets

METHOD OF REIMBURSING PLAYERS FOR SLOT MACHINES

FIELD OF THE INVENTION

The present invention relates to a slot machine and particularly to a method of reimbursing players adopted for slot machines.

BACKGROUND OF THE INVENTION

Please refer to FIG. 1 for a slot machine 1, which is one of the popular gaming machines. After a player stakes a bet, a plurality of reels 2 can be activated to spin. When the reels 2 stop, alignments of symbols are formed to obtain game scores.

The slot machine 1 has many playing methods. For instance, when certain symbols are appeared or a preset condition is satisfied, more game scores may be obtained. This is one of the important features to attract players to play the slot machine 1.

However, under completely random setting, there is probability of failing to obtain any alignment due to unmatched symbols or just obtaining less alignments and results in no or less scores awarded. The player could be easily discouraged or feel frustrated or even disgusted to play the slot machine 1 after playing for a long-term duration. As a result, utilization of the slot machine 1 drops, and revenue of the slot machine 1 also decreases.

SUMMARY OF THE INVENTION

The primary object of the present invention is to provide a method of reimbursement to repeatedly execute a reimbursement game module until a set threshold is satisfied to get corresponding game scores to meet player's expectation for the slot machine.

To achieve the foregoing object, the present invention provides a method of reimbursing players adopted for a slot machine. The slot machine calculates symbol alignments generated by spinning a plurality of reels and gets game scores. The method includes steps as follows: execute a recording module, execute a reimbursement judgment module, execute a reimbursement game module, execute a win judgment module and execute a game selection module.

The recording module records game rounds and game conditions of the slot machine. The reimbursement judgment module judges whether a reimbursement condition is satisfied that includes the game rounds reaching a round threshold setting and the game conditions not reaching a condition threshold setting. When the reimbursement judgment module judges that the reimbursement condition is satisfied, repeatedly executing the reimbursement game module to accumulate the game scores. When the win judgment module judges that the game conditions have reached a reimbursement threshold setting, stop execution of the reimbursement game module. The game selection module allows a player to select to restart the game or end the game. The game selection module is executed either when the reimbursement judgment module judges that the reimbursement condition is not satisfied, or when the win judgment module judges that the game conditions have reached the reimbursement threshold setting.

Thus during playing the slot machine, when the player has spent a lot but get too little in return, the invention can provide a reimbursement as incentive to mitigate player's disappointment and give the player excitement of anticipation for winning. Namely, by adding the reimbursement scheme in the invention, when it is judged that the player does not get sufficient profit in the slot machine after playing a certain number of game rounds, i.e. not yet reach the condition threshold setting, the reimbursement scheme is activated to allow the player to continuously get game scores through the reimbursement game module. Once the reimbursement threshold setting is reached, execution of the reimbursement game module is stopped. Hence player's expectation can be fulfilled to foster a winning scenario in playing the slot machine, and the attraction of the slot machine to the player also is enhanced.

The foregoing, as well as additional objects, features and advantages of the invention will be more readily apparent from the following embodiments and detailed description, which proceeds with reference to the accompanying drawings. The embodiments serve merely for illustrative purpose and are not the limitations of the invention.

DETAILED DESCRIPTION OF THE PREFERRED EMBODIMENTS

Figure 1:
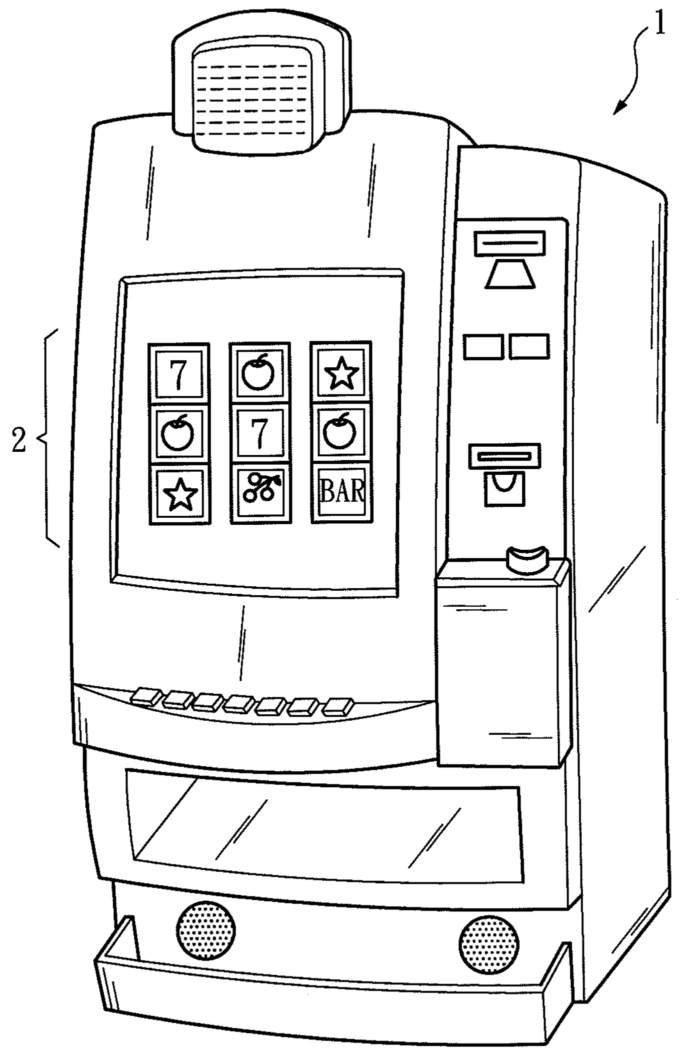
Fig. 1 PRIOR ART
FIG. 1 is a perspective view of a conventional slot machine.
Figure 2:
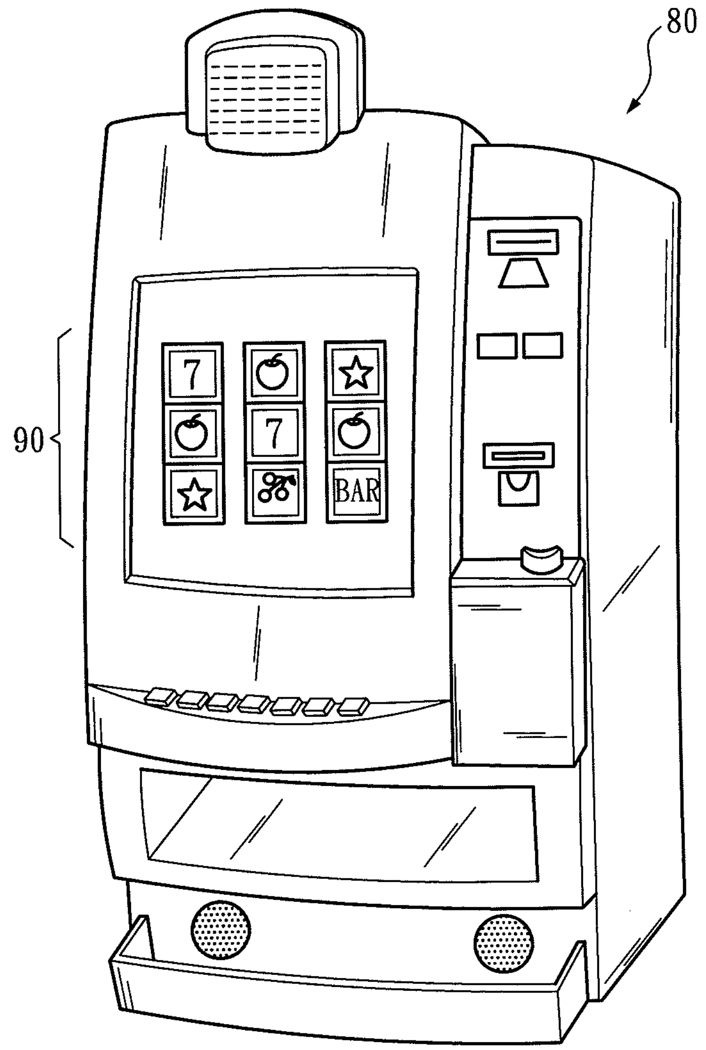
FIG. 2 is a perspective view of a slot machine and a plurality of reels of the invention.
Figure 3:
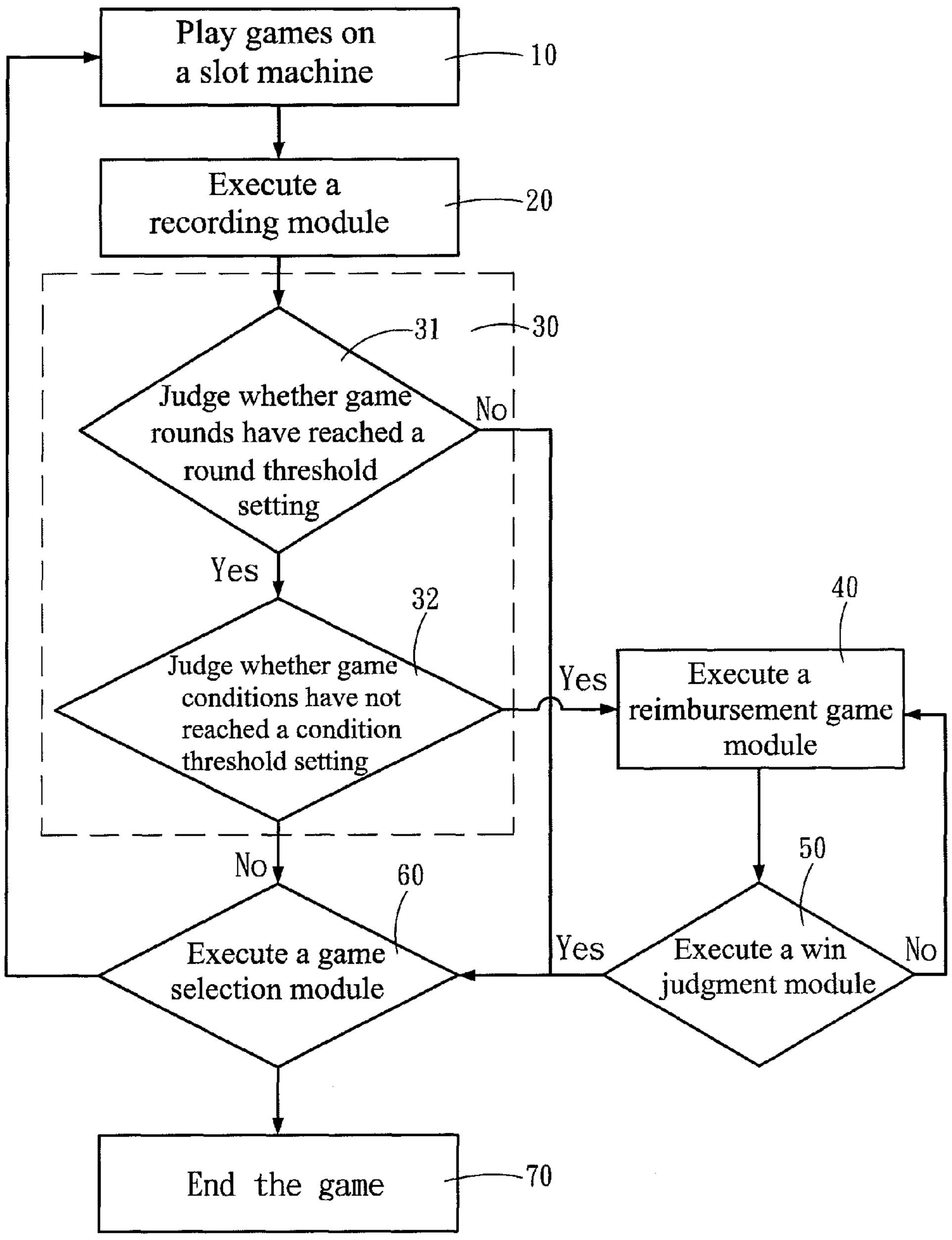
FIG. 3 is a flowchart of the invention.

Please refer to FIGS. 2 and 3, the present invention aims to provide a method of reimbursing players adopted for slot machines. It begins at step 10: executing after a slot machine has started operation to calculate symbol alignments generated by spinning a plurality of reels and get game scores. The method of the invention includes steps of: step 20: executing a recording module; step 30: executing a reimbursement judgment module; step 40: executing a reimbursement game module; step 50: executing a win judgment module; and step 60: executing a game selection module.

Step 20: executing the recording module; the recording module recording game rounds and game conditions of the slot machine.

Step 30: executing the reimbursement judgment module, in which including two procedures to judge whether a reimbursement condition is satisfied. First, procedure 31: judge whether the game rounds have reached a round threshold setting; and next, procedure 32: judge whether the game conditions not reaching a condition threshold setting; namely, the reimbursement condition includes the game rounds have reached the round threshold setting and the game conditions not reaching the condition threshold setting.

Step 40: executing the reimbursement game module; at step 30, when the reimbursement judgment module judging that the reimbursement condition is satisfied, repeatedly executing the reimbursement game module to accumulate the game scores.

Step 50: executing the win judgment module; stopping execution of the reimbursement game module after the win judgment module has judged that the game conditions have reached the reimbursement threshold setting.

Step 60: executing the game selection module; the game selection module allowing a player to select to proceed step 10 to restart the game on the slot machine or proceed step 70 to end the game. The game selection module is executed either when the reimbursement judgment module judges that the reimbursement condition is not satisfied, or when the win judgment module judges that the game conditions have reached the reimbursement threshold setting.

Figure 4:
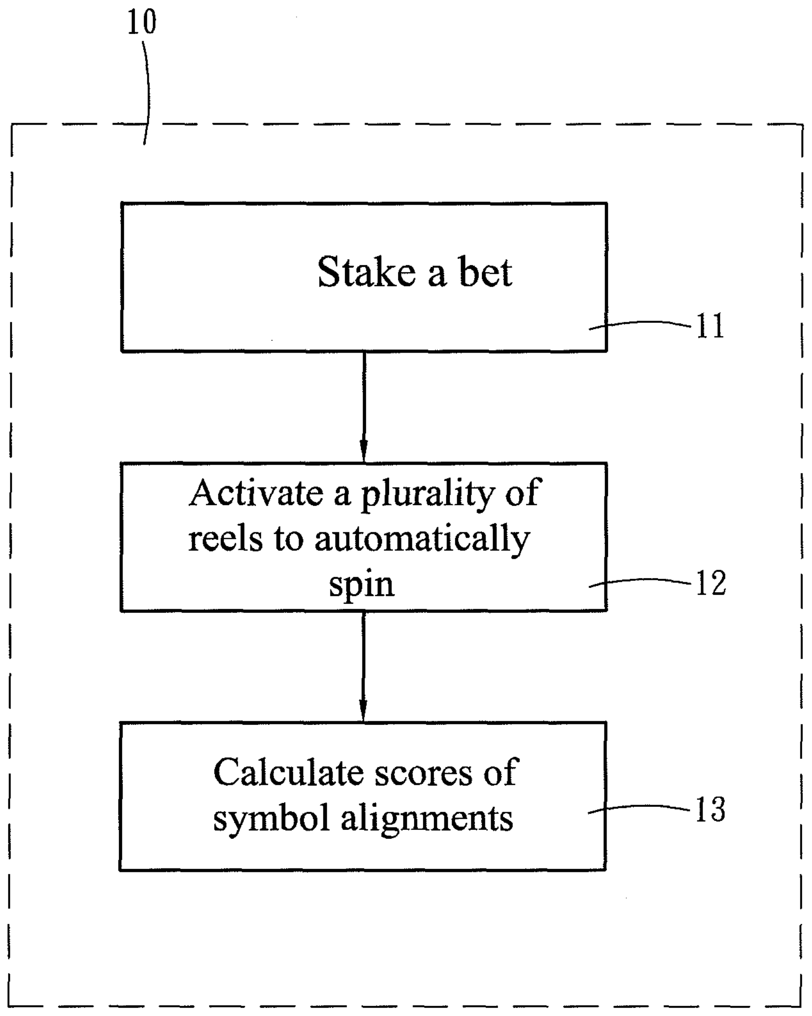
FIG. 4 is a flowchart of the slot machine of the invention.

Please refer to FIG. 4 for the steps of playing the slot machine. It includes steps of: step 11: staking a bet; step 12: activating the reels to automatically spin; and step 13: calculating scores of the symbol alignments.

Figure 5:
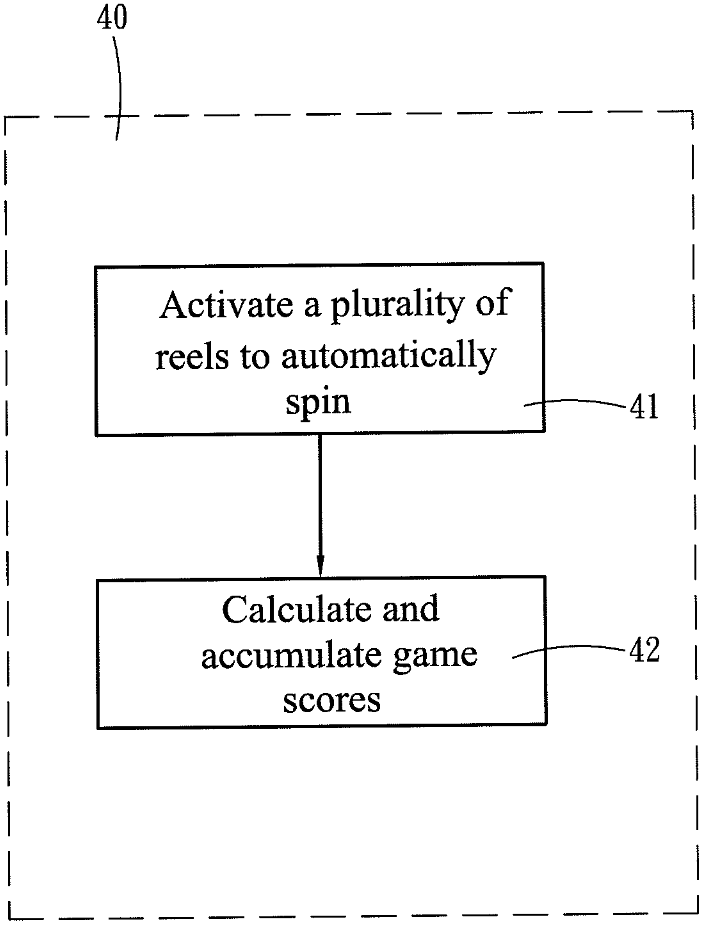
FIG. 5 is a flowchart of the reimbursement game module of the invention.

Please refer to FIG. 5 for the steps of executing the reimbursement game module. It includes steps of: step 41: activating the reels to automatically spin; and step 42: calculating and accumulating the game scores.

It is to be noted that the round threshold setting, condition threshold setting and reimbursement threshold setting can be set according to requirements without restrictions. Four embodiments are discussed below as examples, but not the limitations of the invention.

First embodiment: condition threshold setting and reimbursement threshold setting can be set as the game scores of continuous game rounds greater than a designated ratio of total bets of the continuous game rounds: for instance, take ten continuous game rounds and the designated ratio of 20% as an example; namely, the condition threshold setting is the game scores of ten continuous game rounds greater than 20% of the total bets of the ten continuous game rounds. The reimbursement threshold setting can be set according to requirements and set at a value higher than that of the condition threshold setting so that the player can get a big award after having entered the reimbursement game, thus is increased the expectation of the player to enter the reimbursement game.

Second embodiment: condition threshold setting and reimbursement threshold setting can be set as the total game rounds that have the game scores higher than a designated value greater than a designated ratio of a round number of the continuous game rounds: for instance, take twenty continuous game rounds, and the designated value being double of bet amount in a single round, and the designated ratio of the round number being 5% as an example; namely, the condition threshold setting is in twenty continuous game rounds, the total game rounds that have the game scores higher than the double of the bet amount in the single round are greater than 5% of twenty continuous game rounds. The reimbursement threshold setting can also be set according to requirements.

Third embodiment: condition threshold setting and reimbursement threshold setting can be set as the total game rounds with a wild symbol appeared on the reels in the continuous game rounds greater than a designated ratio of a round number in the continuous game rounds; the wild symbol can substitute any symbol of the slot machine. For instance, take ten continuous game rounds and the designated ratio of the round number being 10% as an example; namely, the condition threshold setting is in ten continuous game rounds, the total game rounds with the wild symbol appeared on the reels are greater than 10% of ten continuous game rounds. The reimbursement threshold setting can also be set according to requirements.

Fourth embodiment: condition threshold setting and reimbursement threshold setting can be set as total numbers of the reels which have a wild symbol appeared thereon in the continuous game rounds greater than a designated ratio of the total numbers of the reels; the wild symbol can represent any symbol of the slot machine. For instance, take ten continuous game rounds, nine reels and the designated ratio being 33% as an example; namely, the condition threshold setting is in ten continuous game rounds, the total numbers of the reels which have a wild symbol appeared thereon is greater than 33% of the total numbers (nine) of the reels. The reimbursement threshold setting can also be set according to requirements.

In the aforesaid four embodiments, in the event that the condition threshold setting is not reached, proceeding step 40 to accumulate the game scores through the reimbursement game module.

As a conclusion, through the slot machine of the invention, players can get reimbursement as an incentive to alleviate disappointment and have an additional chance to win. In other words, the reimbursement judgment module of the invention can judge whether the players have reached the round threshold setting and condition threshold setting in the game. When the round threshold setting is reached but the condition threshold setting is not yet reached (the reimbursement condition is satisfied), the reimbursement scheme is activated to allow the players to continuously get the game scores through the reimbursement game module. Once the reimbursement threshold setting is reached, execution of the reimbursement game module is stopped. Thus the invention can assure the player to earn the profit from the slot machine, realize anticipation of the player, and attract the player to play the slot machine.

What is claimed is:

1. A method of reimbursing a player during playing a game on a slot machine which calculates symbol alignments generated by spinning a plurality of reels and gets game scores, the method comprising steps of:

executing a recording module which records game rounds and game conditions of the slot machine;

setting a reimbursement condition and a reimbursement threshold; the reimbursement condition being the game rounds having reached a round threshold and the game conditions not reaching a condition threshold;

executing a reimbursement judgment module to judge whether a reimbursement condition is satisfied;

executing a reimbursement game module in which is repeatedly executed to accumulate the game scores when the reimbursement judgment module has judged that the reimbursement condition is satisfied;

executing a win judgment module which stops execution of the reimbursement game module after the win judgment module has judged that the game conditions have reached the reimbursement threshold; and executing a game selection module to allow the player to select to restart the game or end the game; the game selection module being executed when the win judgment module judges that the game conditions have reached the reimbursement threshold.

2. The method of claim 1, wherein the slot machine performs the game including steps of: staking a bet, activating the reels to automatically spin and calculating scores of the symbol alignments.

3. The method of claim 1, wherein the step of executing the reimbursement game module further includes steps of: activating the reels to automatically spin, and calculating and accumulating the game scores.

4. The method of claim 1, wherein the condition threshold setting and the reimbursement threshold setting are the game scores of continuous game rounds greater than a designated ratio of total bets of the continuous game rounds.

5. The method of claim 1, wherein the condition threshold setting and the reimbursement threshold setting are the total game rounds that have the game scores higher than a designated value greater than a designated ratio of a round number of the continuous game rounds.

6. The method of claim 1, wherein the condition threshold setting and the reimbursement threshold setting are the total game rounds with a wild symbol appeared on the reels in the continuous game rounds greater than a designated ratio of a round number in the continuous game rounds; the wild symbol representing any symbol of the slot machine.

7. The method of claim 1, wherein the condition threshold setting and the reimbursement threshold setting are total numbers of the reels which have a wild symbol appeared thereon in the continuous game rounds greater than a designated ratio of the total numbers of the reels; the wild symbol representing any symbol of the slot machine.

8. The method of claim 1, wherein a bonus is repeatedly paid.

9. The method of claim 8, wherein the bonus is stopped when the reimbursement threshold setting is reached.

* * * * *